United States Patent [19]
Khan et al.

[11] Patent Number: 5,920,816
[45] Date of Patent: *Jul. 6, 1999

[54] LOCATION REGISTER FOR A LAND-LINE SUPPORTED PRIVATE BASE STATION OPERABLE IN A CELLULAR SYSTEM

[75] Inventors: Muzibul H. Khan, Marlboro; Robert Thomas Saizan, Holmdel, both of N.J.

[73] Assignee: AT&T IPM Corp., Coral Gables, Fla.

[*] Notice: This patent is subject to a terminal disclaimer.

[21] Appl. No.: 08/509,406

[22] Filed: Jul. 31, 1995

[51] Int. Cl.$^6$ ........................................... H04Q 7/38
[52] U.S. Cl. ..................... 455/435; 455/445; 455/555; 455/561
[58] Field of Search .................... 455/435, 432, 455/422, 445, 555, 554, 560, 561, 433, 567

[56] References Cited

U.S. PATENT DOCUMENTS

| | | | |
|---|---|---|---|
| 4,682,351 | 7/1987 | Makino | 455/463 |
| 4,833,701 | 5/1989 | Comroe et al. | 455/432 |
| 4,980,907 | 12/1990 | Raith et al. | 455/432 X |
| 5,315,637 | 5/1994 | Breeden et al. | 455/435 |
| 5,321,737 | 6/1994 | Patsiokas | 455/414 |
| 5,353,340 | 10/1994 | Kunz | 455/432 |
| 5,402,470 | 3/1995 | DeVaney | 455/422 |
| 5,479,483 | 12/1995 | Furuya et al. | 455/555 |
| 5,537,457 | 7/1996 | Lantto et al. | 455/433 |
| 5,610,974 | 3/1997 | Lantto | 455/433 |
| 5,670,950 | 9/1997 | Otsuka | 455/555 |
| 5,745,852 | 4/1998 | Khan et al. | 455/433 |
| 5,761,620 | 6/1998 | Furuya et al. | 455/435 |
| 5,777,560 | 7/1998 | Sakai et al. | 340/825.44 |

OTHER PUBLICATIONS

*TIA/EIA Interim Standard*, "800 MHz TDMA Cellular—Radio Interface—Mobile Station—Base Station Compatibility—Digital Control Channel"; TIA/EIA/IS–136.1; Telecommunications Industry Association, Washington, D.C.; Dec. 1994.

*TIA/EIA Interim Standard*, "800 MHz TDMA Cellular—Radio Interface—Mobile Station—Base Station Compatibility—Traffic Channels and FSK Control Channel"; TIA/EIA/IS–136.2; Telecommunications Industry Association, Washington, D.C.; Dec. 1994.

*Primary Examiner*—Dwayne D. Bost
*Assistant Examiner*—Tracy M. Legree

[57] ABSTRACT

A private base station location register supports the registering of multiple mobile stations at a private base station and provides control information for enabling a personalized call delivery feature at the private base station for each registered mobile station. When registration of a mobile station with a private base station is performed, the private base station location register receives mobile station information from a private base station along with assignment of a local unique address for each one of the multiple mobile stations registering with the private base station. When the private base station receives an incoming call for a particular one of the mobile stations, this local unique address associated with the particular station is provided by the base station location register as part of the incoming call information also received by the base station thereby allowing the base station to distinctively alert the particular mobile station. By receiving a local unique address for each of the mobile stations from the base station location register, the private base station is also able to advantageously offer various intelligent features which are personalized according to customer needs. For example, a calling party may have his or her name displayed on the reached mobile station for the convenience of the user at this mobile station.

28 Claims, 4 Drawing Sheets

_LOCATION REGISTER FOR A LAND-LINE SUPPORTED PRIVATE BASE STATION OPERABLE IN A CELLULAR SYSTEM_

TECHNICAL FIELD

BACKGROUND OF THE INVENTION

1. Technical Field

This invention relates generally to wireless radio telephones and, more particularly, to radio telephones operative with a private base station.

2. Description of the Prior Art

Modern cellular telephone systems currently utilize high power, frequency, time and/or code division multiplexed narrowband radio frequency communication techniques in conjunction with large cells to establish and maintain telephone communications. With the growing popularity of mobile stations configured for operating in these systems, increased flexibility in user utilization of these mobile stations is desired. One approach to providing user flexibility while encouraging greater utilization of the mobile stations is by providing low-power private base stations over which a user can register his or her mobile station and make and receive telephone calls. A private base station shares the same frequency bands with large cells, but operates at a greatly reduced power level. Also, each private base station has a land-line subscriber telephone number through which all incoming and outgoing calls are routed.

Although private base stations currently exist that can support registration of multiple mobile stations, a call received at a private base station for any one of mobile stations registered with this base station causes all mobile stations registered with the base station to be similarly alerted. While this type of operation has been generally satisfactory in the past when the likelihood of only one or two mobile stations would be registered with a private base station at any given time, it is now technically feasible and desirable to provide control information to a private base station which accommodates many more mobile stations for enabling the base station to produce an alerting signal for a mobile station only when an incoming call is received for this mobile station.

SUMMARY OF THE INVENTION

In accordance with the present invention, a private base station location register supports the registering of multiple mobile stations at a private base station and provides control information for enabling a personalized call delivery feature at the private base station for each registered mobile station.

When registration of a mobile station with a private base station is performed, the private base station location register receives mobile station information from a private base station along with assignment of a local unique address for each one of the multiple mobile stations registering with the private base station. When the private base station receives an incoming call for a particular one of the mobile stations, this local unique address associated with the particular station is provided by the base station location register as part of the incoming call information also received by the base station thereby allowing the base station to distinctively alert the particular mobile station.

By receiving the local unique address for each of the mobile stations from the base station location register, the private base station is also able to advantageously offer various intelligent features which are personalized according to customer needs. For example, a calling party may have his or her name displayed on the reached mobile station for the convenience of the user at this mobile station.

BRIEF DESCRIPTION OF THE DRAWING

This invention and its mode of operation will be more clearly understood from the following detailed description when read with the appended drawings in which.

Throughout the drawings, the same element when shown in more that one figure is designated by the same reference numeral.

DETAILED DESCRIPTION

Figure 1:
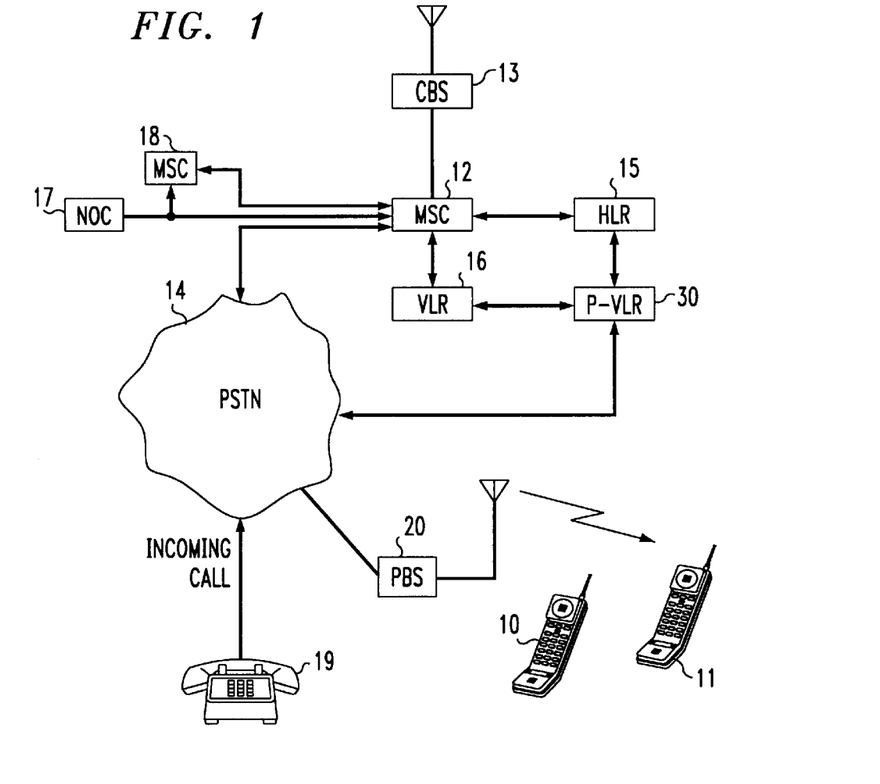
FIG. 1 shows a simplified block diagram of a cellular switching system, its logical entities as well as the relative connection with the public switched telephone network and a private base station.

Referring now to FIG. 1, there is shown a simplified block diagram of a cellular switching system, its logical entities as well as the relative connection with the public switched telephone network and a private base station. The cellular concept is well known and is described in general in the _Bell System Technical Journal_, Volume 58, Number 1, January 1979, and specifically in an article entitled _The Cellular Concept_ by V. H. MacDonald, on pages 15 through 41 of this journal.

Included within the cellular switching system are mobile stations (MS) 10 and 11, mobile switching center (MSC) 12, the public telephone switched network (PSTN) 14, a cellular base station (CBS) 13, a home location register (HLR) 15, a visiting location register (VLR) 16, a private base station visiting location register (P-VLR) 30, and a private base station (PBS) 20. A subscriber station telephone set 19 is illustratively shown connected to the public telephone switched network 14 in a well known manner.

For clarity, mobile switching center 12 is illustratively shown connected to mobile switching center 18 and network operation controller (NOC) 17. The mobile switching center 18 is part of the overall cellular systems operation and may similarly have an home location register, a visiting location register, a P-VLR, as well as multiple cellular base stations associated therewith. It is understood that other mobile switching centers also may be part of the cellular system. The network operation controller provides overall control and thereby ensures that the operation of the whole cellular system is supported and serviced.

The mobile stations 10 and 11 and base station 20 are designed to operate in a cellular system in accordance with the Telecommunications Industry Association (TIA) Interim Standard (IS)-136, dated December 1994.

The mobile switching center 12 performs all the switching functions related to call delivery and is interconnected to the public telephone switched network 14, the home location register 15, the visiting location register 16 and the cellular base station 13.

The home location register 15 maintains a data base, profile record and call routing information or a pointer to the call routing information for all mobile stations in a particular assigned home area. The visiting location register 16 maintains a data base for call routing information or a pointer to the call routing information for those mobile stations which are visiting its assigned area of coverage.

The private base station visiting location register 30 performs the interface functions between a private base station, such as station 20, and both the home location register 15 and the visiting location register 16 for holding both call routing information and, in accordance with the disclosed embodiment, order of registered position information for the mobile stations that are currently registered with the private base station. The private base station visiting location register 30 is also responsible for administering spectrum utilization and operations of the private base station 20.

The functions for the private base station visiting location register 30 may be conveniently summarized as follows:

1. Authorize new private base station operation.
2. Download private base station operating parameters and performs operation administration.
3. Authenticate all calls received from private base station.
4. Perform Registration Notification task to HLR/VLR when network update is received from private base station.
5. Perform mobile station inactive task to HLR/VLR when network cancellation is received from private base station.

The private base station 20 qualifies for private (or non-public) mode time-division-multiple-access (TDMA) cellular operation under IS-136 cellular radio interface, which permits a cellular mobile station to register with a private base station to receive or originate calls through a land-line connected to the public telephone switched network instead of through a cellular base station, such as cellular base station 13, connected in the regular public cellular system. Specifically, this radio interface provides the digital control channel in accordance with TIA IS-136.1 and the traffic channels and control channel in accordance with TIA IS-136.2 for communication with the mobile station. A modem interface between the private base station and the private base station visiting location register also is supported by the radio interface.

The private base station 20 is limited to a very low level of transmitted power for restricting its coverage range to a relatively small area. This allows the private base station to reuse the same radio frequency spectrum used by the macro cellular systems as long as the frequency of use selected by the private base station is different from the cell for the regular public or macro cellular system in whose area of coverage the private base station is located. The operating frequency spectrum for the private base station is selected in a way that insures no interference to the macro cellular system. This is achieved by directing the private base station to perform channel scanning and interference measurements before selecting its operating frequencies. While operating in its normal mode awaiting receipt of an incoming call or an off-hook request from a registered mobile station, the private base station 20 continually broadcasts digital control channel information containing its identity and system parameters.

An IS-136 compliant mobile station can search for a private base station's control channel transmission using a number of techniques. One of these may be based on the mobile station's prior knowledge of the private base station's existence. Another may be in response to a mobile station user manually directing the mobile station to search for the private base station. In yet another technique the mobile station, upon finding the control channel of the private base station, automatically goes through a series of controlled procedures to obtain registration with the private base station.

Once a mobile station, for example, station 10 or 11, obtains a successful registration with the private base station 20, the private base station 20 makes a modem connection to the private base station visiting location register 30 to update the mobile station's temporary line dialing number (TLDN). The temporary line dialing number in this case will be the private base station's land-line number (LLN). Hence, when an incoming call is directed to a particular mobile station, information including the temporary line dialing number for this mobile station is accessed from the private base station visiting locating register 30 through the home location register 15 or the visiting location register 16 and the call routed to the private base station's LLN. It is also understood that the temporary line dialing number may be stored in either the home location register 15 or the visiting location register 16, and the mobile switching center 12 then accesses this TLDN from this register. The private base station 20 detects the ring for an incoming call and sends an alerting signal or page to the registered mobile station. Following the mobile station's response to the alerting signal, private base station 20 establishes a traffic channel for the mobile station and generates an off-hook condition to connect the incoming call through the private base station to the mobile station.

The private base station 20 supports the registering of multiple mobile stations and, in accordance with the disclosed embodiment, provides a personalized call delivery feature for each registered mobile station. In order to provide the personalized call delivery feature, during the TLDN update for the mobile station at the private base station visiting location register 30, additional information elements, i.e., digits, are added to the TLDN update for distinguishing a particular mobile station with the private base station 20. During the registration of a mobile station with the private base station, a local unique address is generated at the private base station. This local unique address may be either advantageously generated from the mobile station identification number contained in each mobile station or generated from an ordered position assigned by the private base station for each portable station registered with the private base station.

Thus by way of illustrative example of the operation of the ordered position registration, the mobile station that registers with the private base station 20 is inserted in registered position 1 by the private base station visiting location register 30, and the second mobile station is inserted in registered position 2 by the private base station visiting location register 30 and so forth. This ordered position information is advantageously treated as the local unique address or a subaddress by the private base station 20 for each mobile station registered with it. A distinct identity of binary digits for each mobile station distinguishing it from all other mobile stations registered with private base station 20 is obtained thereby.

The private base station receives the binary digits describing the order of registered position in the same manner as caller-ID delivery is achieved. The ordered position information is appended to the caller-ID message that accompanies an incoming ring signal or is appended to the time slot allocated for the caller-ID message when such message is not present. Switching offices that provide caller ID messages to a telephone station capable of decoding and storing the incoming telephone number are either shown or described in U.S. Pat. No. 4,277,649 which issued to D. Sheinbein on Jul. 7, 1981.

Knowing the order of registered position, the private base station along with the help of a mobile station user's profile stored in the private base station can support additional features like 1. Caller name display on the phone;
2. Distinctive alerting;
3. Call blocking;
4. Incoming call log; and
5. Telephone answering device/message support.

Figure 2:
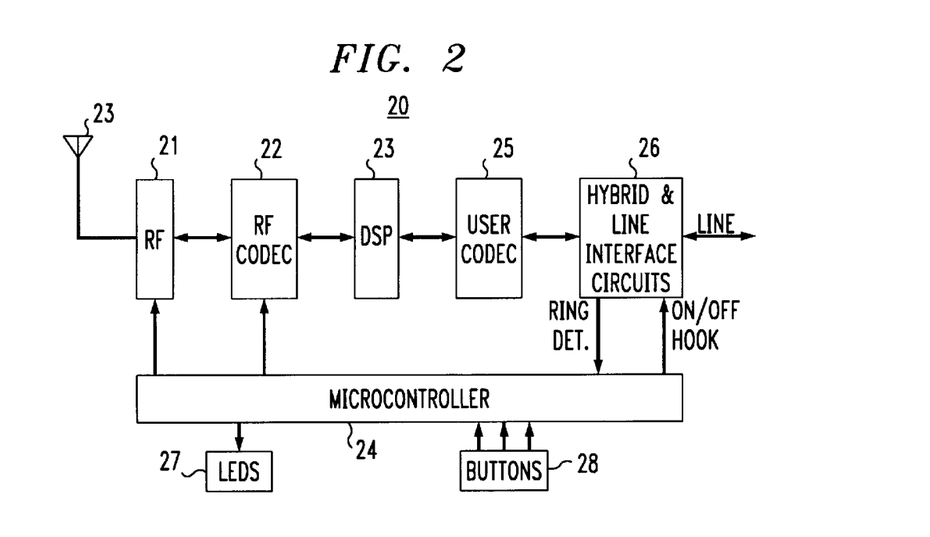
FIG. 2 shows a high level block diagram of a private base station separated into identifiable circuit sections.

Shown in FIG. 2 is a high-level block diagram of private base station 20 separated into identifiable circuit sections. A radio frequency (RF) circuit 21 performs the radio frequency signal processing. Included in this circuit is a radio frequency receiver section which receives the radio frequency signal from the mobile stations 10 and 11 and, after appropriate filtering and down conversion, produces I and Q signals for an RF CODEC 22 which is connected to the RF circuit 21. A radio frequency transmit section in RF circuit 21 receives the I and Q signals from the RF CODEC 22, converts these signals to the appropriate radio frequency range and amplifies them for wireless transmission via antenna 23.

The RF CODEC 22 performs analog-to-digital (A/D) conversion of the I and Q signals received in the receiver section of the RF circuit 21 and digital-to-analog (D/A) conversion of the I and Q signals provided to the transmitter section of the RF circuit 21. The RF CODEC 22 also performs modulation for the transmission path.

Connected to the RF CODEC 22 is a digital signal processor (DSP) 23 which performs all the baseband signal processing for the private base station applications. This involves speech encoding/decoding, time-division-multiple-access framing/deframing, channel encoding/decoding, and other modem functions such as, for example, automatic gain control, symbol timing recovery, synchronization, and the like. The DSP 23 also communicates with a microcontroller 24 for exchanging control messages. A user CODEC 25 performs conversion of digitally sampled speech signals to analog speech signals and also performs conversion of analog speech signals to digitally sampled speech signals.

Connected to the user CODEC 25 is a hybrid and line interface circuits interface section 26 which performs the required functions for interfacing the private base station 20 to the public switched telephone network 14. These include such functions and circuits as, for example, switch-hook operations, hybrid, ring detect, line termination, on/off hook signal interface signals and the like. The microcontroller 24 performs the call processing functions between the private base station 20 and any registered mobile stations as well as all other control functions that are required for operation of the private base station 20. LEDs 27 provide visual feedback to a user who makes entries at the private base station. Buttons 28 connect to the microcontroller 24 and are used in making the entries in the private base station 20. Once such entry, as described later herein, is that made by the primary user of the base station who directs this base station to register a mobile station for the first time.

Figure 3:
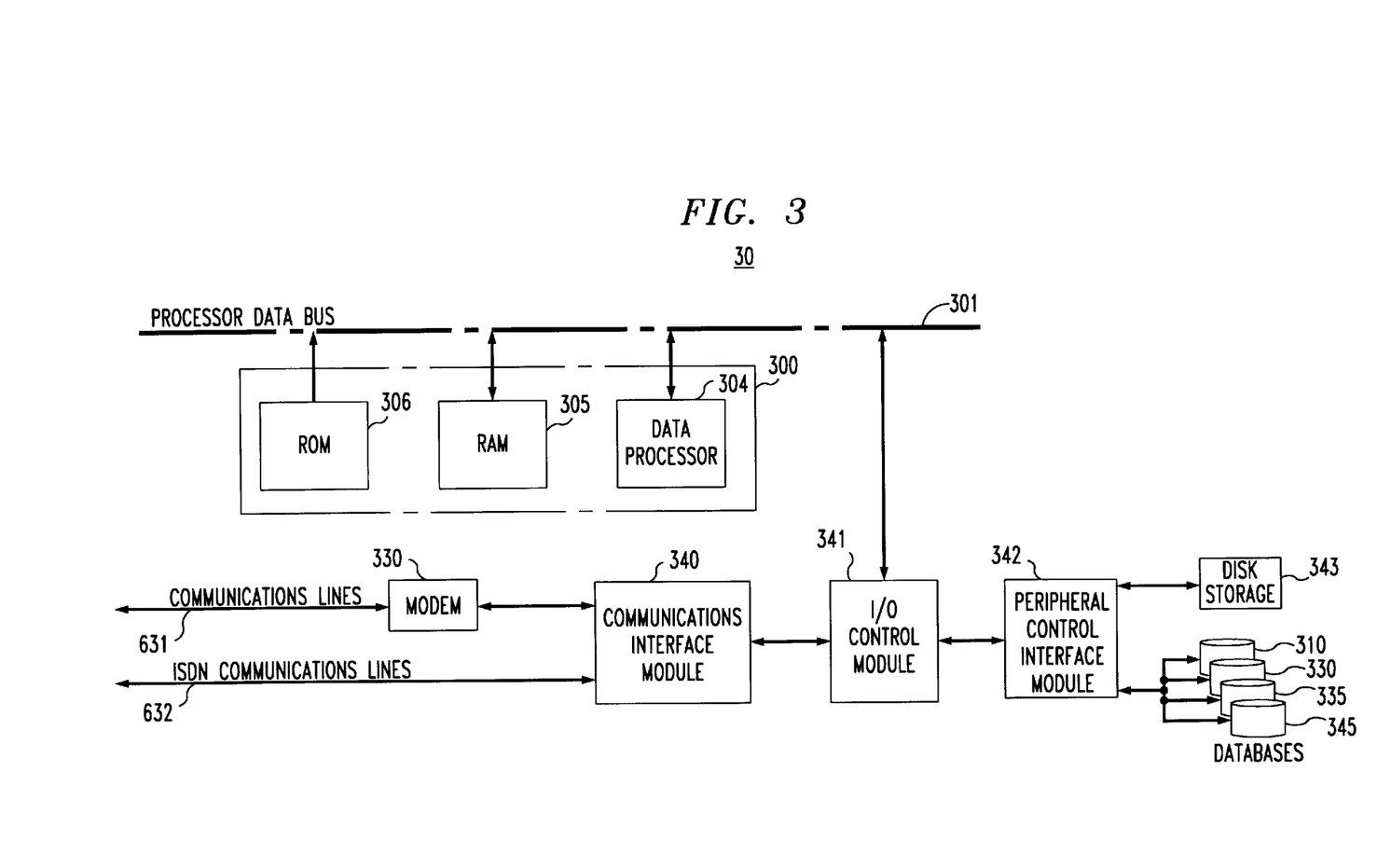
FIG. 3 shows a high level block diagram of a private base station visiting location register separated into identifiable circuit sections, in accordance with the invention.

Referring now to FIG. 3 of the drawing, there is shown in accordance with the disclosed embodiment a general block diagram of a private base station visiting location register 30. This private base station visiting location register 30 may be geographically located away from or colocated with either a visiting location register or a home location register, with which it receives and provides private base station information. Moreover, the functions provided by the private base station visiting location register 30 also may be integrated into a visiting location register or a home location register, and such operation is hereby anticipated. The elements employed in the private base station register are computer 300, modem 330, control interface modules 340, 341, and 342, disk storage unit 343 and a plurality of databases 310, 330, 335 and 340.

The input to the private base station register 30 from a private base station, such as private base station 20, is provided over two-way communications lines 631 to the modem pool 330. The communications modem pool 330 typically provides data communication between multiple private base stations and the private base station visiting location register through the public telephone switched network. In providing this communications, any number of well known protocols that exists in the industry today may be used. By way of example, modem protocols such as V.22, V.22 bis or Bell 212 are all suitable for communications between the modem pool 330 and a private base station through the public telephone switched network. It is also possible to have a packet data protocol provide the two-way communications requirement. For example, an X.25 packet data protocol may be used in providing this communications.

Also connected to the communications interface module 340 are integrated services digital network (ISDN) communications lines 332. Although ISDN are shown, other lines may suitably be used in providing this communications, as well. The ISDN lines 632 are connected directly to the communications interface module 340 and enable the private base station visiting location register 30 to maintain communications between the home location register 15 and the visiting location register 16. Protocols that may be used in providing this ISDN communication may be, by way of example, either IS-41 or SS7 which are well-known in the industry.

The data signals received by modem pool 330 over both communications lines 331 and 332 are provided to a communications interface module 340. The data received by the interface module 340 is coupled to the input/output control module 341 for processing by the computer 300 or for input to or accessing one of more of a series of databases, illustratively shown as database 310, 330, 335 and 345, as well as a disk storage medium 343, via the peripheral control interface module 342. The peripheral control interface module 342 interfaces the computer 300 and communication lines to the appropriate ones of the series of databases, or data files in accordance with the service or task being performed.

Each one of the series of databases 310, 330, 335 and 345 contain specific information. For example, the database 310 contains information of frequency allocations of surrounding cellular systems. Database 330 contains information of private base stations operating parameters determined by the private base station's location. Examples of a private base station operating parameters are its operating frequency, transmitted power, authorization timer, and the like. Database 335 contains mobile station order of registered position information with the private base station and also private base station profiles. Examples of private base station profiles are "Call Waiting" and "Caller ID" that are provided by the public telephone switched network, and also any private base station specific interface requirements. Database 345 contains operation and maintenance information for each private base station registered with the private base station location register 30. It is to be understood that other databases providing additional services or tasks also may be interfaced with the computer 300 via the peripheral control interface module 342.

Disk storage 343 contains operational information that is applicable to the cellular system in general, such as operation parameters that are required for interfacing the private base station visiting location register with home location register and visiting location register.

Contained in the computer 300 are a data processor 304, random access memory (RAM) 305 and read only memory (ROM) 306. This processor 304 responds to data input into input/output control module 341. And with input from random access memory 305 and read only memory 306, processor 304 also provides the data to the processor bus 301 for facilitating data exchanges between the plurality of databases and the communications interface module 340 via the peripheral control interface module 342.

Figure 4:
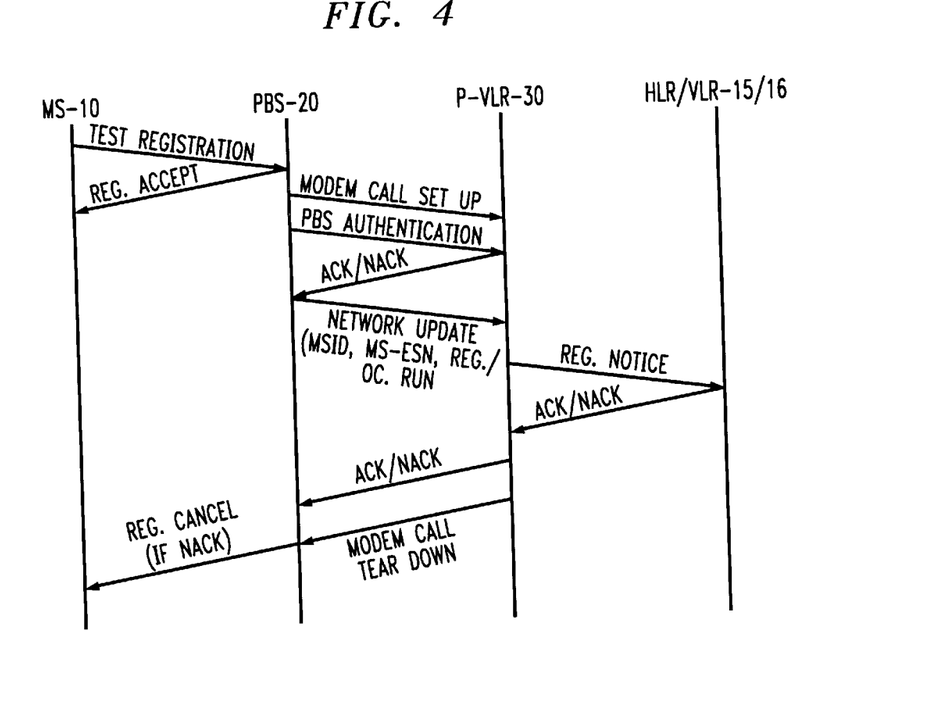
FIG. 4 shows a registration/network update process through which a mobile station gains access to a private base station, in accordance with the invention.

Referring next to FIG. 4, there is shown a registration/network update process through which a mobile station, such as mobile station 10, gains access to a private base station, such as private base station 20. The private base station initially authorizes the mobile station to obtain registration through it. After such initial authorization, the mobile station remains on the digital control channel. The private base station then seeks authorization for registration of the mobile station from the private base station visiting location register. This camping of the mobile station on the digital control channel can be terminated by the host private base station if proper authorization from the private base station visiting location register is not obtained. During the registration process, the home location register 15 or visiting location register 16 is provided a call forwarding number from the private base station visiting location register (the private base station's LLN) for the mobile station.

There are two kinds of registration processes that take place between the mobile station and the private base station. One is the initial registration of the mobile station with the private base station. In this case, the private base station has no prior knowledge of the mobile station and will not accept its attempt to register unless the primary user of the private base station directs the private base station to do so. This acceptance process can be accomplished by the primary user pressing a registration button on the base station and then to prevent fraudulent registration, for example, entering a coded sequence of digits which only he or she knows. Once a mobile station obtains initial registration, it can automatically obtain subsequent registration with the private base station upon its arrival within the private base station's coverage area. Thus, this subsequent registration does not require intervention of the primary user of the private base station in any manner.

The registration process begins when an authorized mobile station sends a test registration (registration sequence) to the private base station. This registration/network update process is summarized below and also illustrated in FIG. 4.

1. The mobile station sends a test registration which includes the mobile stations' identification (mobile station ID) and the mobile station's electronic serial number (ESN) to the private base station.
2. The private base station sends back a registration accept signal to the mobile station.
3. The private base station establishes a modem call to the P-VLR.
4. The private base station performs an authentication task to satisfy P-VLR's requirements.
5. The P-VLR sends an acknowledge or negative acknowledge (ACK/NACK) to the private base station in response.
6. Receipt of the NACK response cancels further transaction by the private base station and the mobile station registration attempt will be cancelled. Depending on the situation, the private base station also may be directed to shut down and retry registration at some subsequent time.
7. Following receipt of an ACK, the private base station performs a network update when the mobile station ID, mobile station ESN, land-line number as well as the order of registered position obtained for the mobile station are sent to the P-VLR. The order of registered position uniquely identifies the mobile station among other currently registered mobile stations within the private base station.
8. The P-VLR sends a Registration Notification to either the HLR or VLR. If the mobile station is in its home cellular coverage area, the notification will be directed to the HLR. Otherwise, the VLR will receive the notification. In the later case the HLR for the mobile station's home area will also be notified of the registration notification.
9. The HLR or VLR sends an ACK or NACK to the P-VLR. If a NACK is sent, The denial could depend on a number of factors that depend on the service provider. For example, the provider may find that the mobile station does not have a valid service with it, or a second example could be that the mobile station does not have a valid mobile ID number, or it could be any other similar reason.
10. The P-VLR sends corresponding ACK or NACK to the private base station.
11. After receipt by the private base station of the ACK or NACK, the modem call is terminated.
12. If a NACK is sent to the private base station by the P-VLR, the private base station sends a registration cancellation to the mobile station.

The first mobile station registered with the private base station in this process is allocated the position location number 1. The subsequent mobile stations registered with the private base station are given correspondingly increasing numbers. A private base station can typically support, by way of example, 10 such registrations, although more or less may be desired and the private base station suitably configured to accommodate different numbers. If a new mobile station registration request is properly received which exceeds the number then allocated for supporting registered mobile stations, the least used mobile registration number will be vacated to make room for the new one. Once registered, the mobile station does not need to re-register in this particular sense. Whenever the mobile station attempts to obtain subsequent registration for service with the private base station, the registration location number for the mobile station remains unchanged, assuming some minimal level of periodic use. During the process of subsequent service provision, the private base station always sends to the private base station visiting location register 30 the same registration location number for a particular mobile station. Also, it is understandable that the information exchange for a new mobile station registration will be much more extensive when compared to its subsequent registration with the private base station.

Figure 5:
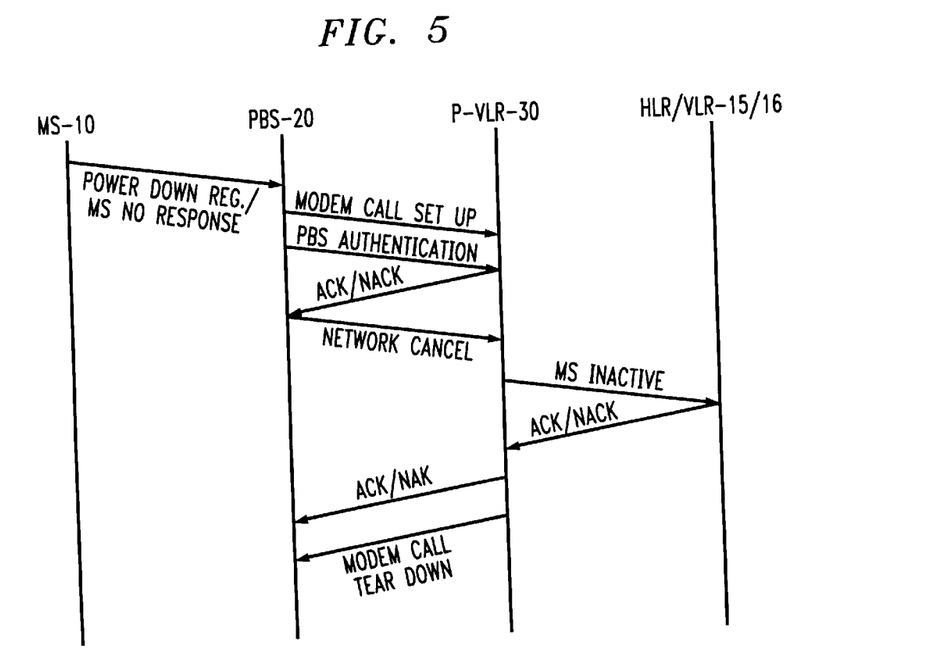
FIG. 5 shows a network cancellation process which details how a registration of a mobile station with a private base station is canceled, in accordance with the invention.

Referring now to FIG. 5, there is shown a network cancellation process in which a pre-established and existing registration of a mobile station with a private base station is canceled or terminated. The network cancellation process begins when an authorized mobile station moves out of the private base station's coverage area or the mobile station's power is turned off. When the mobile station moves out of the coverage area of the private base station, the resulting loss of communication from the mobile station is detected by the private base station. Also, when the mobile station's power is turned off, the mobile station performs power-down registration. When either of these two events occurs, the network cancellation process is executed by the private base station. Through this process, any call forwarding to the private base station's land line number for the mobile station is cancelled. This network cancellation process is summarized below and also illustrated in FIG. 5.

1. The mobile station performs power-down registration.
2. The private base station establishes a modem call to the P-VLR.
3. The private base station performs an authentication task to satisfy the P-VLR's requirements.
4. The P-VLR sends either an ACK or a NACK in response.
5. If the NACK response is received, the private base station cancels further transactions for this particular mobile station. The private base station also may be directed to shut down or to attempt a retry later at authentication.
6. If an ACK response is received, the private base station performs network cancellation by sending the mobile station ID and the mobile station ESN to cancel call forwarding of telephone calls to the mobile station which has either moved out of the coverage area or whose power is turned off.
7. The P-VLR sends a mobile station inactive signal to HLR/VLR.
8. The HLR/VLR then sends either an ACK or a NACK to the P-VLR.
9. The P-VLR sends a corresponding ACK or NACK to the private base station.
10. Followed by the sending of the ACK or NACK to the private base station, the modem call is terminated.

The user of a mobile station may elect to terminate communication with a private base station and reenter his or her mobile station into the cellular system. A mobile station may exercise this option when, for example, service at the private base station is not available due to the single land line connection to the public telephone switched network being occupied by another mobile station communicating through the shared private base station.

A mobile station user may reenter the cellular system simply by, for example, pressing a cellular service button which executes a process wherein service with the private base station is terminated and service with the cellular service provider in the public cellular system is established. Once cellular service is established with, for example, cellular base station 13, shown in FIG. 5, a network update is performed by home location register 15 if the mobile station is located in its home coverage area or by visiting location register 16 if the mobile station is outside its home coverage area. Next, either home location register 15 or visiting location register 16 informs private base station visiting location register 30 that the identified mobile station has returned to the cellular system. The private base station visiting location register 30 then stores a mobile station inactive signal for the identified mobile station effectively inactivating or cancelling its call forwarding information.

Once the land line between the private base station 20 and the public telephone switched network 14 becomes available, the network cancellation process described in FIG. 5 is attempted by the private base station. Since call forwarding for the identified mobile station has already been cancelled in the private base station visiting location register 30, in this instance by the mobile station reentering the cellular system, executing this process only confirms that the mobile station is presently not active with the private base station 20.

Figure 6:
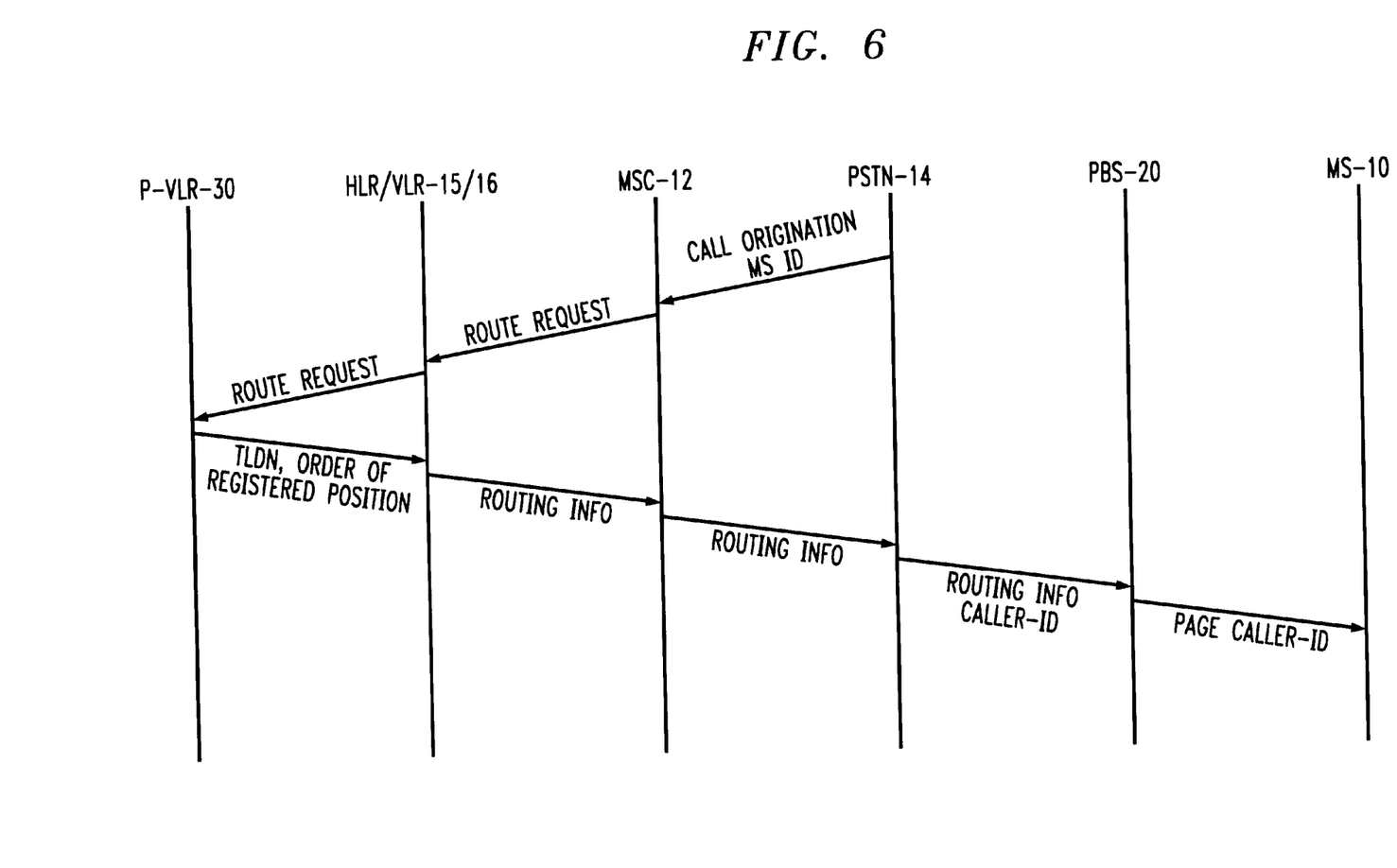
FIG. 6 shows a network process which provides an incoming call transaction flow for a mobile station registered with a private base station, in accordance with the invention.

Referring next to FIG. 6, there is shown a network process which provides an incoming call transaction flow for a mobile station registered with a private base station. All incoming calls for each one of the mobile stations registered with the private base station will be routed to the private base station's land-line number. The call transaction flow is summarized below and with reference to FIG. 6.

1. A call origination and the dialed mobile station ID are received from the public switched telephone network and routed to the MSC. Alternatively, the MSC may receive the call origination and the dialed mobile station ID from the cellular base station 13 in the public cellular system.
2. The MSC sends a route request to the mobile station's HLR (or to the VLR when the mobile station is a visiting station).
3. The HLR forwards the Route Request to the corresponding P-VLR which contains the registration information for the mobile station.
4. The P-VLR, returns the TLDN as well as the order of registered position to the HLR (or to the VLR when the mobile station is a visiting station) as part of the routing information. In this case, the order of registered position is defined as a subaddress for the mobile station.
5. The HLR adds mobile station ID and mobile station ESN to the routing information and returns the location request to the MSC which, in turn, forwards this information to the PSTN.
6. The call is delivered by the PSTN, which may include caller ID, to the LLN, the subaddress containing order of registered position is also sent along with the caller ID to the private base station. The private base station then sends a page to the mobile station along with the caller ID. The paged mobile station is the one which corresponds to the order of registered position.

Based on obtaining an order of registered position for each of the mobile stations, the private base station is able to advantageously offer various intelligent features which are personalized according to customer needs. For example, a calling party may have his or her name displayed on the mobile station for the convenience of the user at the mobile station.

The user of a registered mobile station is provided with a separate memory space allocated at the private base station to store a directory of phone numbers with names respectively associated with the telephone numbers. Upon receiving an incoming call for a particular mobile station (distinguished by the order of registered position), a calling party having a number that matches with one of the stored numbers in the directory will have his or her name sent to the mobile station by the private base station for display instead of the telephone phone number.

The private base station is able to provide distinctive alerting for a registered mobile station. The user of a registered mobile station can have, for example, a distinctive ringing sound (chosen from a group of ring sounds) associated with a particular calling party stored in his or her directory. Distinctive ringing is illustrately described in U.S, Pat. No. 4,995,075. When an incoming call is from the particular calling party, the private base station is able to alert the mobile station using the distinct ringing sound.

The private base station is also able to provide a number of other advantageous functions based on obtaining an order of registered position for each of mobile stations. Features such as call blocking, an incoming call log, such as described in U.S. Pat. No. 5,386,460, and a telephone answering function with personalized mailboxes are easily provided. For call blocking, the user has a choice of blocking an incoming call which number matches one of specified numbers stored in the directory. The incoming call log is advantageously provided in the private base station for each of the registered mobile station users. And the private base station allows personalized greetings to be stored in a mailbox for each of the registered mobile stations. When an incoming call is directed to a particular mobile station and the user of this station does not respond, this personalized greeting is played to the calling party by the private base station.

What has been described is merely illustrative of the present invention. Other applications to wireless telephones, computer or other communication systems other than the disclosed system are contemplated as being within the knowledge of one skilled in the art and may be utilized without departing from the spirit and scope of the present invention.

We claim:

1. A private base station location register for communicating with a private base station, said private base station registering a plurality of portable stations for enabling said portable stations to communicate through said private base station, the private base station location register comprising:

means for receiving a local unique address, generated at the private base station, for each one of the plurality of wireless portable stations, said local unique address being provided for each portable station registered with the private base station; and means for including routing information for routing an incoming call from a calling party to said private base station for an identified portable station and means for appending said local unique address to the routing information for said identified portable station.

2. The telephone system as in claim 1 wherein said local unique address is generated from a mobile station identification number contained in each portable station.

3. The telephone system as in claim 1 wherein said local unique address is generated from an ordered position assigned by the private base station for each portable station registered with the private base station.

4. A private base station location register for communicating with a private base station, said private base station registering a plurality of portable stations for enabling said portable stations to communicate through said private base station, the private base station location register comprising:

means for receiving registration information from the private base station for each one of the plurality of wireless portable stations; and means for assigning ordered position information to said registration information for each one of the plurality of wireless portable stations, said ordered position information being indicative of the respective order in which each portable station is registered with the private base station.

5. The private base station location register of claim 4 further including means for providing said ordered position information to the private base station for each one of the plurality of portable stations.

6. The private base station location register of claim 5 further including means for connecting both said private base station location register and said private base station to a telephone switch in the public switched telephone network.

7. The private base station location register of claim 6 further including means for routing an incoming call from a calling party connected to the telephone switch to said private base station for an identified portable station and means for appending said ordered position information for said identified portable station to the routing information.

8. The private base station location register of claim 7 wherein said routing means includes means for routing said incoming call to said private base station through said telephone switch.

9. The private base station location register of claim 6 further including means for routing an incoming call from a calling party connected in a cellular telephone network to said private base station for an identified portable station and means for appending said ordered position information to the routing information for said identified portable station.

10. The private base station location register of claim 9 wherein said routing means includes means for routing said incoming call to said private base station through said telephone switch.

11. The private base station location register of claim 4 wherein:

functions of said private base station location register are functionally integrated in a visiting location register.

12. The private base station location register of claim 4 wherein functions of said private base station location register are functionally integrated in a home location register.

13. A private base station location register for communicating with a private base station, said private base station registering a plurality of portable stations for enabling said portable stations to communicate through said private base station, the private base station location register comprising:

means for receiving registration information from the private base station for each one of the plurality of wireless portable stations; and means for assigning ordered position information to said registration information for each one of the plurality of wireless portable stations, said ordered position information being accessed by said private base station upon receipt of an incoming call over a telephone line.

14. The private base station location register of claim 13 wherein said ordered position information is indicative of the respective order in which each portable station is registered with the private base station.

15. The private base station location register of claim 14 further including means for providing said ordered position information to the private base station for each one of the plurality of portable stations.

16. The private base station location register of claim 15 including means for connecting both said private base station and said private base station location register to a telephone switch in the public switched telephone network.

17. The private base station location register of claim 16 further including means for receiving an incoming call from a calling party connected to the telephone switch and for routing said call to said private base station for an identified portable station, and means for appending said ordered position information to the routing information for said identified portable station.

18. The private base station location register of claim 17 wherein said routing means includes means for routing said incoming call to said private base station through said telephone switch.

19. The private base station location register of claim 16 further including means for routing an incoming call from a calling party connected in a cellular telephone network to said private base station for an identified portable station and means for appending said ordered position information to the routing information for said identified portable station.

20. The private base station location register of claim 19 wherein said routing means includes means for routing said incoming call to said private base station through said telephone switch.

21. The private base station location register of claim 20 wherein said wireless portable stations are configured for operation in a cellular telephone system.

22. A method of operation for a private base station location register for communicating with a private base station, said base station registering a plurality of portable stations for enabling said portable stations to communicate through said base station, the method including the steps of:

receiving registration information from the private base station for each one of the plurality of wireless portable stations; and assigning ordered position information to registration information for each one of the plurality of wireless portable stations, said ordered position information being indicative of the respective order in which each portable station is registered with the private base station.

23. The method of claim 22 further including the step of providing said ordered position information from the private base station location register to the private base station for each one of the plurality of portable stations.

24. The method of claim 23 wherein the providing step includes the step of connecting both said private base station location register and said private base station to a telephone switch in the public switched telephone network.

25. The method of claim 24 further including the step of routing an incoming call from a calling party connected to the telephone switch to said private base station for an identified portable station and the step of appending said ordered position information for said identified portable station to the routing information.

26. The method of claim 25 wherein said routing step includes the step of routing in the telephone switch said incoming call to said private base station.

27. The method of claim 24 further including the step of routing an incoming call from a calling party connected in a cellular telephone network to said private base station for an identified portable station and the step of appending said ordered position information to the routing information for said identified portable station.

28. The method of claim 27 wherein said routing step includes the step of routing in the telephone switch said incoming call to said private base station.

* * * * *